No. 652,119. Patented June 19, 1900.
R. KNIETSCH.
METHOD OF MAKING SULFURIC ANHYDRID.
(Application filed July 14, 1898.)
(No Model.) 9 Sheets—Sheet 1.

Witnesses.
Fred Kemper
Albert E. Laycock

Inventor:
Rudolph Knietsch
by Gifford & Bull
Attys

No. 652,119. Patented June 19, 1900.
R. KNIETSCH.
METHOD OF MAKING SULFURIC ANHYDRID.
(Application filed July 14, 1898.)
(No Model.) 9 Sheets—Sheet 3.

Fig. 4.

No. 652,119. Patented June 19, 1900.
R. KNIETSCH.
METHOD OF MAKING SULFURIC ANHYDRID.
(Application filed July 14, 1898.)

(No Model.) 9 Sheets—Sheet 6.

No. 652,119. Patented June 19, 1900.
R. KNIETSCH.
METHOD OF MAKING SULFURIC ANHYDRID.
(Application filed July 14, 1898.)
(No Model.) 9 Sheets—Sheet 8.

Fig. 9.

UNITED STATES PATENT OFFICE.

RUDOLPH KNIETSCH, OF LUDWIGSHAFEN, GERMANY, ASSIGNOR TO THE BADISCHE ANILIN AND SODA FABRIK, OF SAME PLACE.

METHOD OF MAKING SULFURIC ANHYDRID.

SPECIFICATION forming part of Letters Patent No. 652,119, dated June 19, 1900.

Application filed July 14, 1898. Serial No. 685,969. (No specimens.)

*To all whom it may concern:*

Be it known that I, RUDOLPH KNIETSCH, doctor of philosophy, a subject of the King of Prussia, Emperor of Germany, residing at Ludwigshafen-on-the-Rhine, in the Kingdom of Bavaria and Empire of Germany, have invented a new and useful Improvement in the Art of Manufacturing Sulfuric Anhydrid, of which the following is a specification.

It is well known that when sulphur dioxide is combined with oxygen to form sulphuric anhydride a considerable amount of heat is evolved. This is stated in literature to be in accordance with the equation $SO_2 + O = SO_3 + 32.2$ Cal. (See Hess, *Poggendorf's Annalen*, Vol. 56, p. 471, 1842; Thomsen, *Annalen der Chemie und Pharmacie* 4, Vol. 30, p. 442, 1873; Ostwald, *Allgemeine Chemie*, 2d edition, Vol. 2, pp. 123 and 124.) The reaction between sulphur dioxide and oxygen only takes place at an elevated temperature, so that it is necessary to submit the gases either separately or in admixture to a preliminary heating. Such heat was applied by exposing the tubes to a low red heat maintained in a surrounding heated chamber from a furnace, as shown in Rath's German Patent No. 22,118, of 1883, or in Ellice-Clark's English Patent No. 3,166 of 1888, or in Haenisch and Schroeder's United States Patent No. 384,841, of 1888, or in Starck's English Patent No. 12,028 of 1889. During the reaction the heat of chemical union becomes added to that applied, and thus the temperature at the zone of maximum reaction may rise to an enormous degree, even to a bright red heat, according to the richness in sulphur dioxide of the gas mixture or to the strength of the current of the gases, or both.

It has long been known that the low percentage in yield of $SO_3$ was the obstacle preventing the commercial success of the contact method, and various causes have been suggested for this low percentage, such as the nature of the contact material or the presence of diluting-gases; but it remained for me to discover that the high temperature above referred to was the true cause and to provide the hereinafter-described process based upon such discovery as a remedy for the difficulty.

By regulating the temperature of the contents of the chamber containing the contact substance in such manner as to substantially avoid the presence therein of excess of heat due to the reaction I attain a condition of temperature in the contact-chamber which is within wide limits independent of the quantity and richness of the gas mixture treated and by which it is possible to obtain a practically-quantitative yield of sulphuric anhydride to a degree comparable with the action in the sulphuric-acid chambers, particularly when I also restrain the zone of maximum reaction against movement away from the first portion of the contact substance and maintain a decreasing temperature from this zone to the latter portion of the contact substance. This approximately-quantitative yield is also accompanied by other advantages, such as the preservation of the iron parts of the apparatus against destruction by oxidation, as well as the preservation of the contact substance against weakening. In this process platinized asbestos is the contact substance recommended for use. It can, for instance, be prepared as described in the specification of Winkler's German Patent No. 4,566. (See also *Lunge's Sulphuric Acid and Alkali*, 2d edition, Vol. 1, p. 863, and *Dammer Chemische Technologie*, Vol. 1, p. 189.)

The manner of practicing my new process can be varied in many respects. In particular regard must be had to the richness of the gases to be treated. I generally effect the cooling of the contact-chamber so as to produce the most favorable range of temperature therein by means of a current of gas. Both the rate of flow and the temperature of this current are kept under control. I use, for instance, air in this way or the actual gases which are to be treated themselves; but the cooling can be effected in other ways—for instance, in liquid baths, especially molten-metal baths, whose temperatures are under control. When the gases to be treated are themselves used for cooling the contact-chamber, a part or the whole of the current of gases so to be treated is caused to pass through the space exterior to the chamber containing the contact substance, so as to withdraw from the latter the excess of heat due to the reaction. The gases coming from the cooling-chamber are thus in some cases brought to the temperature best suited for the most favorable course of the reaction, and in other cases a further heating or a cooling operation is necessary. This depends largely upon the richness of the gases.

In the preferred embodiment of this process the excess of heat due to the reaction is removed from the converted gas as it is passing through the reaction-chamber by the absorption of such heat in the gas which is about to be converted by causing the whole or a portion of the gas about to be converted to be passed within heat-absorbing proximity to the converted gas while said converted gas is in the course of its passage through the contact-chamber, whereby the maximum temperature within the contact-chamber is restricted substantially between the limits of composition and decomposition of sulphuric anhydride.

I describe my apparatus in various forms in the following typical examples, having reference to the drawings.

In all of the above figures certain corresponding parts are lettered as follows.

M is an inclosure which may consist of brickwork or of an iron pipe.

R is the contact chamber or chambers, shown in the form of a tube or tubes supported at one end by the tube-plate W and in most of the figures at the other end by the tube-plate W'.

S' is an air-passage surrounding the contact tube or tubes from end to end and having an inlet $n$ at one end and an outlet L at the other end.

$h\ h$ are means of heating the air-current at or near the entrance end of the passage S', which heating means should be capable of prompt extinction, lighting, and regulation, such as gas-flames. The current of air in the passage S' may serve as a medium for heating to start the reaction and as a medium for cooling or regulating the temperature while the reaction is in progress.

S in the figures where it appears is a passage surrounding the contact tube or tubes R, by which passage the gas containing sulphur dioxide and oxygen is conducted and held in contact with the tube or tubes R from end to end on its way to the ingress end of the said tube or tubes.

$S^2$ is a tube secured to the tube-plate W, whereby the passages S and S' are separated.

$c$ is a passage by which the sulphuric anhydride is received at the egress end of the contact tube or tubes R and conducted away from the apparatus.

O is a pipe leading to the apparatus from a source of a mixture of gas containing sulphur dioxide and oxygen.

$v\ v'\ v^2\ v^3\ v^4$, &c., are hand-valves of ordinary construction for closing or partially closing the pipes in which they are respectively placed, whereby the operator is enabled to cut off or regulate the current of gas containing sulphur dioxide and oxygen or of air, as the case may be.

G is a heater of any suitable construction adapted for heating the gas containing sulphur dioxide and oxygen or air passing through it.

H is a heat-interchanger by which the air which has cooled the contact substance is conducted adjacent to the gas containing sulphur dioxide and oxygen on its way to the ingress end of the contact tube or tubes, so that the gas containing sulphur dioxide and oxygen may be heated by the excess of heat due to the reaction extracted by the air from the contact substance.

By placing the contact substance in the tube or tubes R, which upon removal of the cover, as D, are open at the top, the tubes may be charged with the contact substance dropped in at the top, so that, as indicated by the broken lines in the figures, it will extend substantially across the opening through the tube R. It thus forms an obstruction or an impediment through which the gases are obliged to pass and which by reason of the tubular form of the receptacle R containing it and also by reason of its lying substantially against the walls of said tube, which walls are cooled by the current adjacent thereto on the outside, presents conditions for effecting the uniform cooling of the contact substance. This result is further facilitated by the fact that the passage S is formed by the combining with said tube or tubes R of the inclosure $S^2$ in a form by means of which each tube R is substantially jacketed by the cooling-current and the thin walls $S^2$ of which (where the cooling-current consists of the gases to be treated) permit the heat transfer, which enables the air-current in the passage S' to assist as an efficient temperature-regulator.

In those forms of the apparatus wherein the gas to be treated is employed as the cooling-current the branches of the pipe O, leading, respectively, to the passage S and to the cover D, with their valves $v\ v'\ v^2$, &c., enable the operator to so apportion the current entering the cover D between that which is heated and that which is unheated as to greatly assist in maintaining the desired temperature of the gases when they enter the contact substance and so to secure the greatest efficiency.

Figure 1:
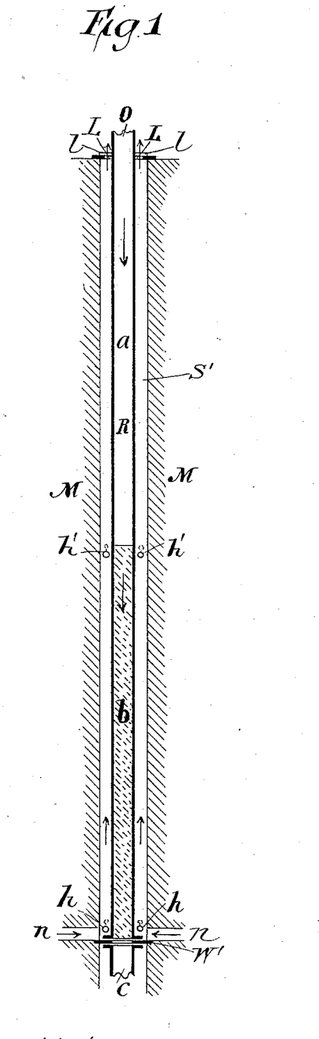
Figure 1 represents in vertical section a form of apparatus in which a single contact-tube is employed and in which the excess of heat due to the reaction is removed by a current of air.

In Fig. 1, M represents a brickwork structure or an iron pipe. Within this a pipe R is fixed having the passage S' between. This pipe R consists of two parts $a$ and $b$, which have different functions and may differ from one another in length and diameter; also, either part can be replaced by a plurality of narrower pipes. The portion $b$ of the pipe R is occupied by the contact substance, (indicated in the drawings by broken section-lines,) and this is cooled by the cold air entering S' at $n$. In the other part $a$ of the pipe R the gases containing the sulphur dioxide which enter at O are heated to the temperature necessary for the reaction.

When commencing the operation, the whole apparatus is first raised to the temperature necessary for the reaction by heating by means of $h\ h$—say gas-flames. Then when rich gases are used, after the reaction has once commenced, further heating is unnecessary, because the air as it passes through the pipe M in contact with that part $b$ of the pipe R in which the reaction is in progress in extracting the excess of heat due to the reaction absorbs heat and then transfers sufficient heat to the other portion $a$ to prevent a change of position of the reaction zone or the entire cessation of the reaction. The current of air can be regulated by means of the updraft-openings L L, which are adjustable by the slides $l\ l$. It is regulated in such a way that the contact mass in $b$ is constantly maintained at the most favorable temperature for the reaction. When the gases contain but little sulphur dioxide, the air which is somewhat heated by its cooling action on the contact substance is further heated by suitable means $h'\ h'$, (such as gas-flames,) so that the gases flowing in through part $a$ receive a greater increment of heat. When the gases are still poorer in sulphur dioxide, it may be necessary to continually heat to some extent the current of air flowing in through $n$ either by means of the gas-flames at $h\ h$ or in some other way. The gases containing the sulphuric anhydride issuing from the contact-chamber $b$ leave the apparatus by the pipe $c$ and are worked up in any suitable way.

Figure 2:
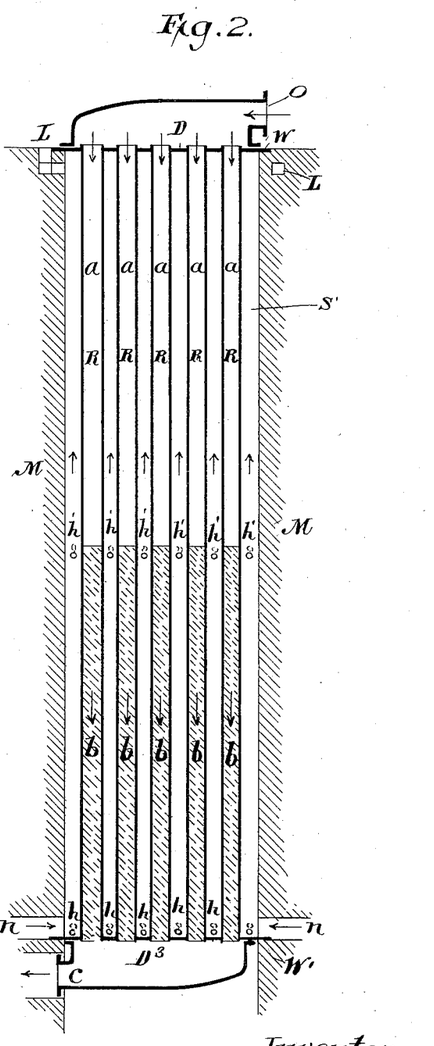
Fig. 2 represents the same, with the exception that it contains a plurality of contact-tubes.

In Fig. 2 an apparatus is represented made up of a plurality of contact-tubes R R, which are in connection with one another by means of the two tube-plates W W' and the covers D $D^3$ above and below. In other respects it resembles Fig. 1.

Figure 3:
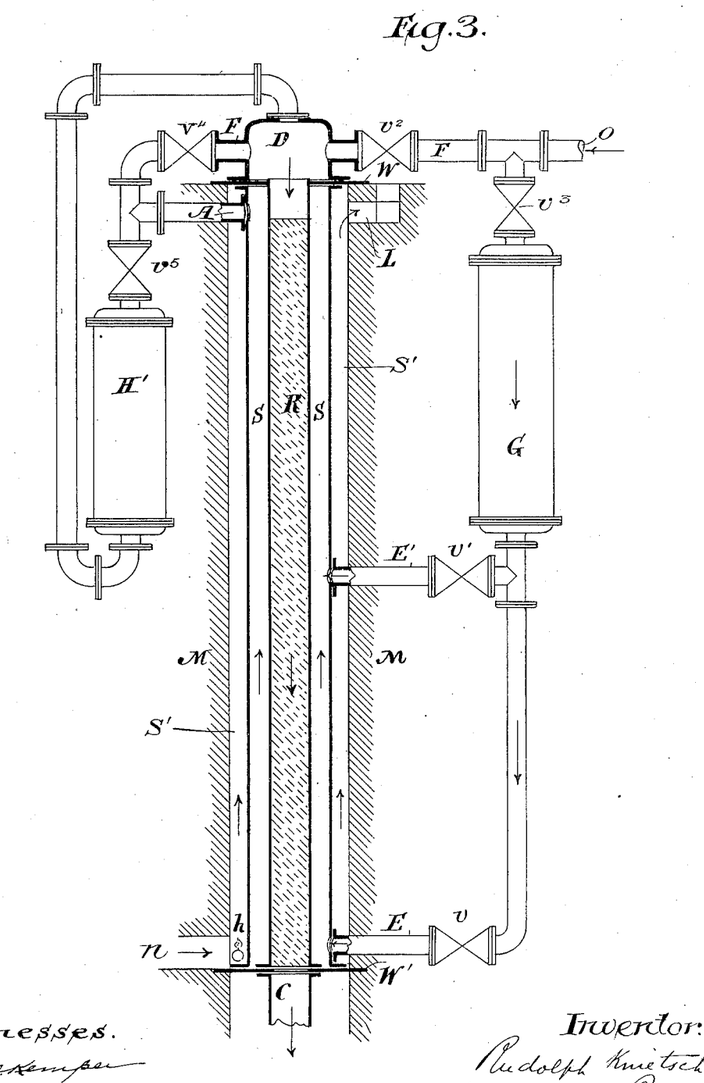
Fig. 3 represents an elevation, partly in section, of an apparatus in which a single contact-tube is employed in which the excess of heat due to the reaction is removed by a current of gas containing sulphur dioxide and oxygen on its way to the ingress end of the contact-tube.

In Fig. 3, within brickwork M, a tube $S^2$ is fixed to the tube-plates W W'. It contains the tube R, extending through or registering with openings through the tube-plates which close the ends of the spaces between said tubes R and $S^2$. The apparatus is brought to the reaction temperature from any source of heating—for instance, the gas-flame $h$, the gases from which can pass away through the flue L. When the reaction is in progress, the source of heat $h$ can usually be extinguished and unheated air be allowed to circulate through the passage S', thus contributing to the cooling of the whole apparatus. The gases to be treated are passed through the entrance-passages E or E' or E and E' into the passage S. The valves $v$ and $v'$ enable the operator to utilize either or both passages. The temperature of the said gas to be treated can be further regulated by a heating apparatus G. This gas cools the contact substance in R and passes on through the openings A and F and the mixing-chamber in cover D into the contact substance in the pipe R. The treated gas issues through $c$. The temperature of the gas can also be regulated before entering D by closing the valve $v^4$ and opening the valve $v^5$, so that the current must pass through the temperature-regulator H'. By closing or partially closing valve $v^3$ and opening valve $v^2$ the gas mixture to be treated can be made in whole or in part to enter the contact chamber or tube through passage $F^2$ without passing through the passage S.

Figure 4:
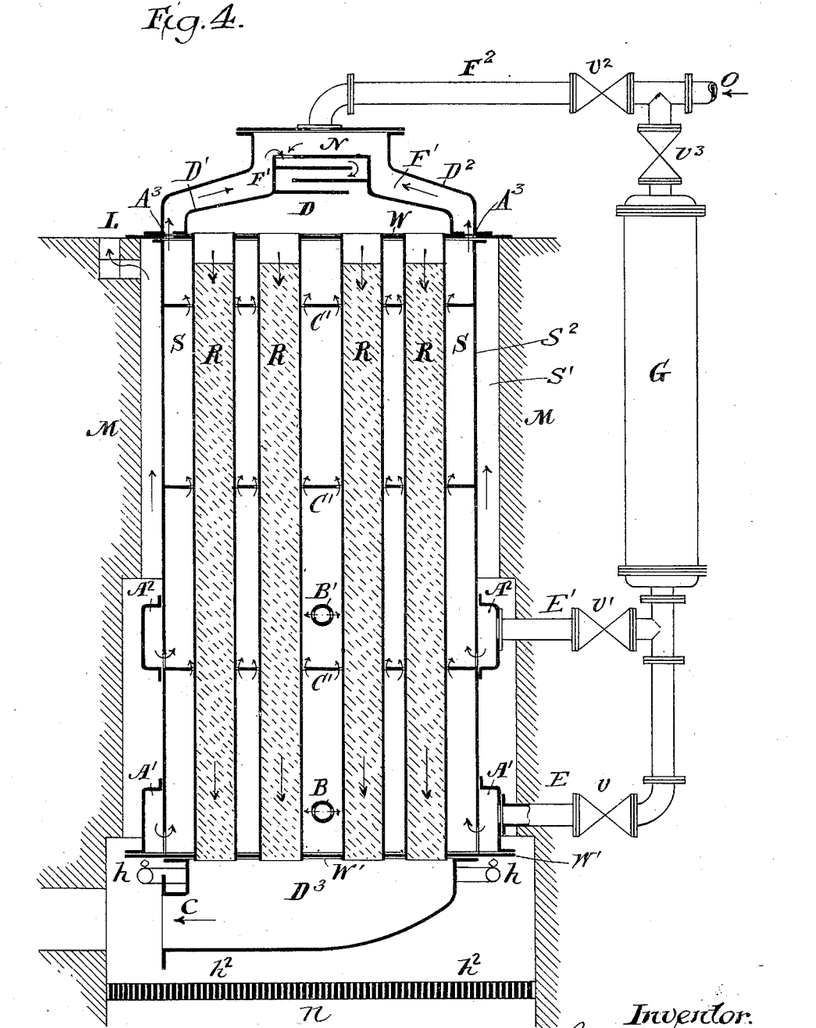
Fig. 4 is an elevation, partly in section, of an apparatus in which there is a plurality of contact-tubes and in which the excess of heat due to the reaction is removed by a current of gas containing sulphur dioxide and oxygen on its way to the ingress ends of the tubes and which apparatus contains additional means for distributing such current along and against the outside of the contact-tubes and for mixing the same preparatory to its entrance into the contact-tubes.

In Fig. 4 a plurality of pipes R are coupled up in one common apparatus. I find the form of apparatus illustrated in Fig. 4 of great practical use and therefore further describe it. I have found that in large apparatus containing many pipes it is advisable to arrange that the current of gas in the passage or chamber S be thoroughly subdivided. This is effected in the first place by the aid of the gas-chambers A' $A^2$, which serve to introduce the gas into the pipe $S^2$ around its entire circumference. Further, by the use of tubes B B', passing diametrically through $S^2$ and furnished with holes at the sides, varying in size in proportion to the section of the circle corresponding thereto, the gas is divided up in a uniform way in the interior of the chamber S.

In order that the cooling-gas may retain the direction of its current and pass as near as possible to the contact substance, I further insert at intervals, which must be not too great, a number of baffles C' C' C', which are arranged within the chamber S in such a way that in passing them the gases are compelled to pass close by the walls of the tubes R R. Further, it is desirable to thoroughly mix the gases before their entrance into the contact substance in order to equalize their temperature. The mixing apparatus N serves this purpose. The cover D is made of two parts D' and $D^2$, with the mixer N placed in the opening at the center of D', through which the gases must pass in proceeding from the openings $A^3$, located at the end of chamber S outside the series of tubes R, inwardly through the passages F', and downwardly to the ingress ends of the tubes R. The air-passage S', with the gas-flames $h$, by which the temperature of the air in the passage S may be promptly regulated, are present, as in Fig. 3. The strength of the current and the temperature of the cooling-gases is regulated upon the basis of the readings of the thermometers in the various parts of the apparatus and especially within the covers D and $D^3$. This regulation should be continued until analyses of the gases entering and leaving the apparatus show that the most favorable practical result is being obtained. $h^2$ $h^2$ is a gas-burner whereby I heat the chamber $D^3$, through which the gases pass away from the egress ends of the contact-tubes in order to maintain such a temperature that the said outgoing gases will not attack the material of the apparatus. This gas-burner can also be used in the first instance for heating up the whole apparatus.

Figure 5:
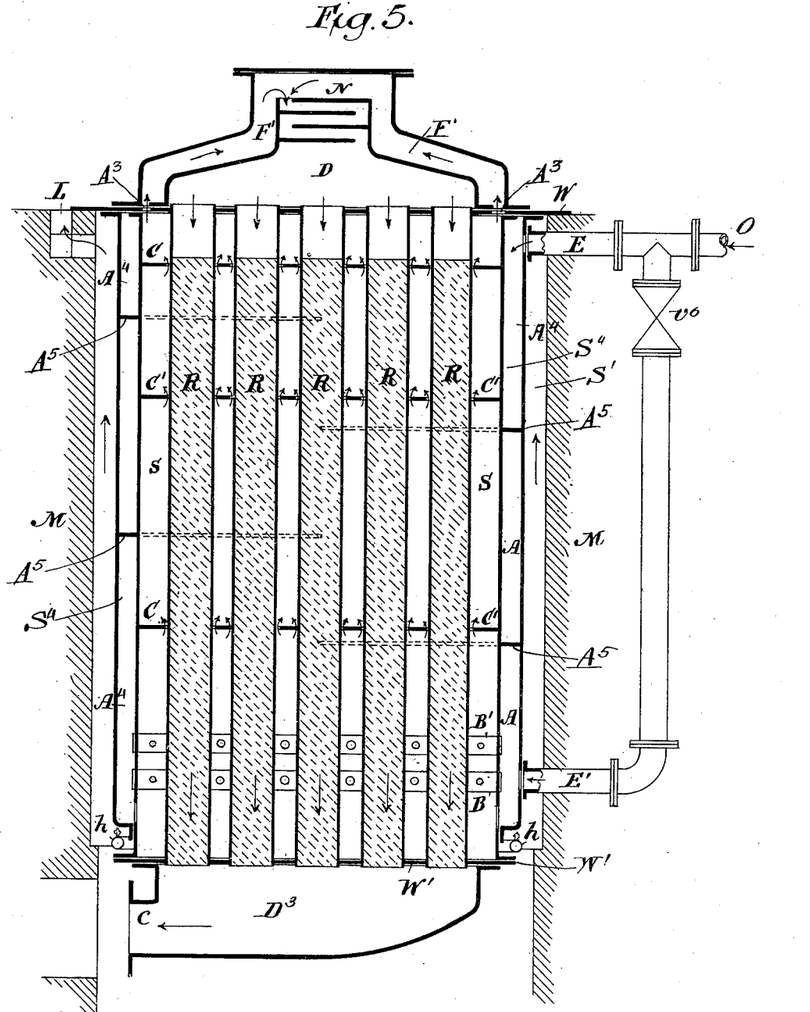
Fig. 5 is an elevation, partly in section, of an apparatus containing a plurality of contact-tubes and in which the excess of heat due to the reaction is removed by the current of gas containing sulphur dioxide and oxygen on its way to the ingress ends of the contact-tubes and which apparatus is provided with particular means for directing said current.

In Fig. 5 is shown a form of apparatus in which the gas-distribution chambers (corresponding with those marked A' $A^2$ in Fig. 4) are extended to form a jacket $A^4$ to the whole apparatus, thus utilizing the radiant heat of the apparatus to heat the cooling-gases. The said jacket is shown as being provided with baffle-plates $A^5$ for giving a circuitous course to the gases. In this form the gas mixture to be treated entering at E passes downward through the jacket-passage $S^4$, thence into the pipes B and B', by which it is distributed in the chamber S, and then pursues the same course as in Fig. 4. A portion of the gas mixture may, however, be introduced into the jacket-passage at the bottom by opening valve $v^6$.

Figure 6:
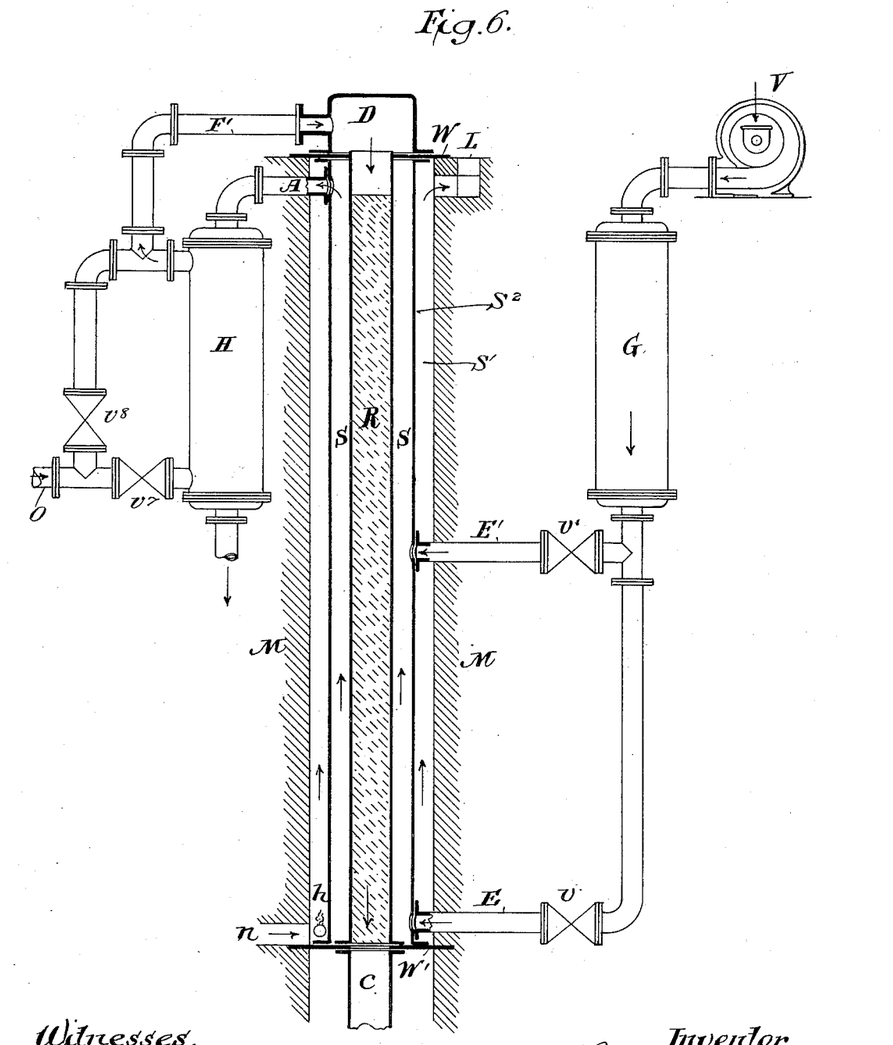
Fig. 6 represents an elevation, partly in section, of another form of apparatus containing a single contact-tube and in which the excess of heat due to the reaction is removed by a current of air and then transferred to the current of gas containing sulphur dioxide and oxygen on its way to the ingress end of the contact-tube.

In Fig. 6 is shown a form of apparatus in which the cooling stream of air or gas is caused by a ventilator or fan V to stream through G and E E' into S. This current cools the tube R and leaves S by A and is not permitted to enter D. The heat of the gas issuing at A can be used in any way desired—for instance, by transferring it to the cold gases to be treated in a suitable apparatus H, which gases can be passed in whole or in part through the heat-interchanger H by the operation of the valves $v^7$ $v^8$.

Figure 7:
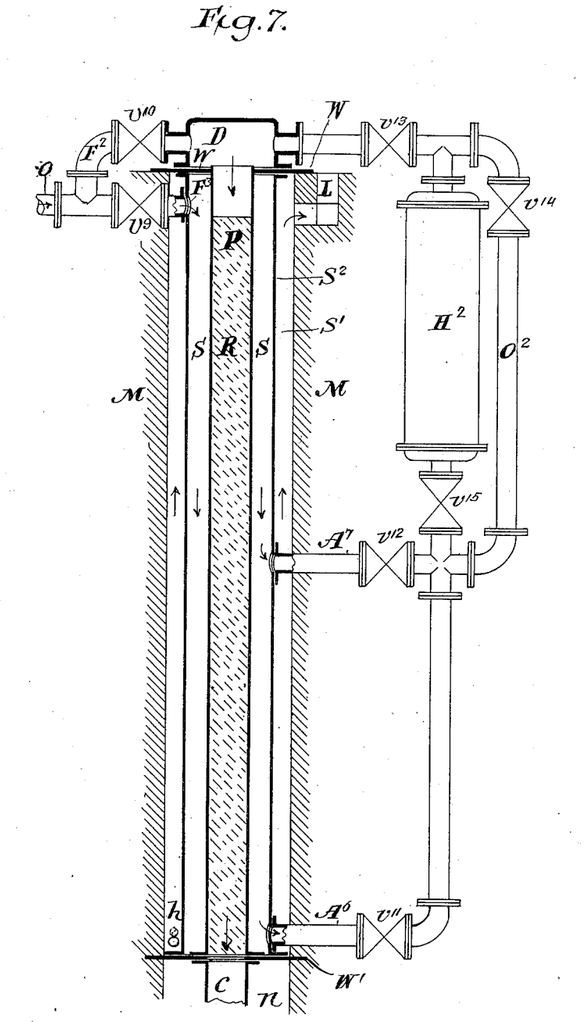
Fig. 7 is an elevation, partly in section, of an apparatus containing a single contact-tube and in which the excess of heat due to the reaction is removed by a current of gas containing sulphur dioxide and oxygen on its way to the ingress end of the contact-tube, which current passes in the same direction, both adjacent to the outside and on the inside of said tube and not inversely, as in the preceding figures.
Figure 8:
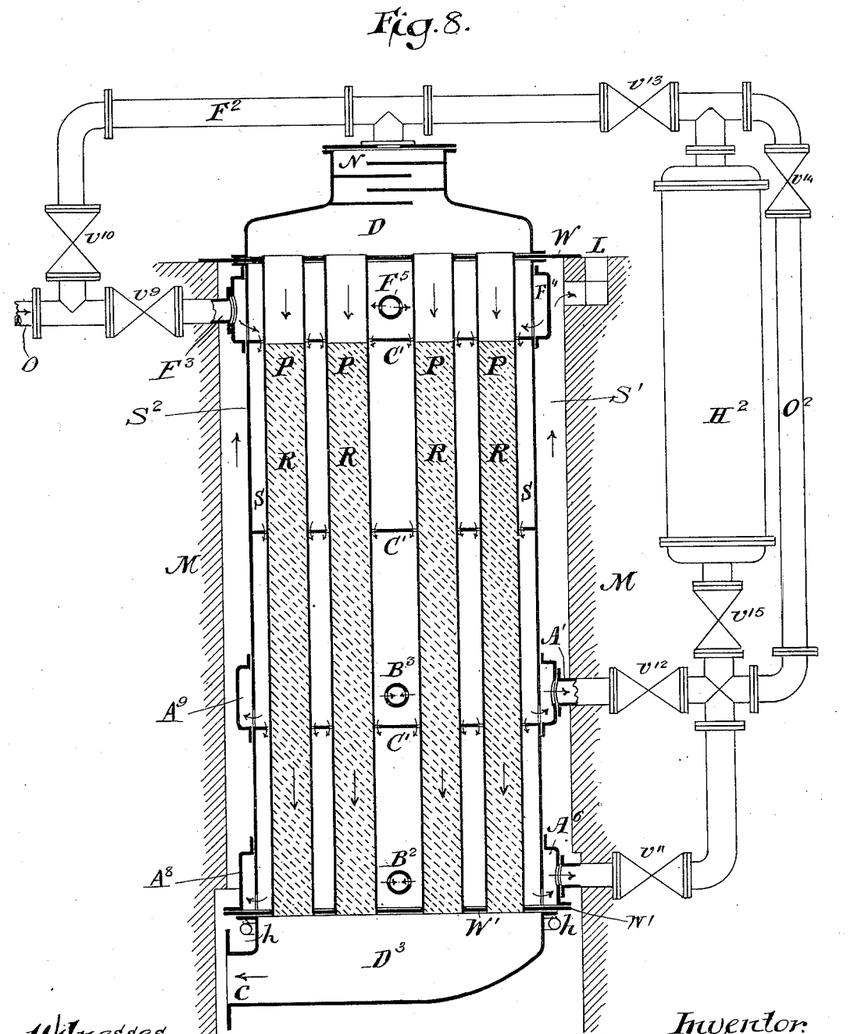
Fig. 8 is a similar apparatus, excepting that it contains a plurality of contact-tubes and additional means for distributing, deflecting, and mixing the current of gas containing sulphur dioxide and oxygen.

In Figs. 7 and 8 I illustrate a further typical form of apparatus for using my process, which is particularly suited for use when treating gas mixtures rich in sulphur dioxide. The current of gas coming through O is led through $F^3$ to the hottest part P of the contact substance in R. In this way the relatively-coldest gas is brought to act upon the hottest part of the contact substance and energetically cools this. The cooling gas-current can leave the passage S through $A^6$ or $A^7$ or through $A^6$ and $A^7$, and can then be conducted either directly through $O^2$ to D or through the cooler $H^2$ to D or through $O^2$ and $H^2$ to D, thereby having its temperature regulated. Also a portion of the gas can be led at the same time direct through $F^2$ to D. All of this regulation can be effected by the valves $v^9$ $v^{10}$ $v^{11}$ $v^{12}$ $v^{13}$ $v^{14}$ $v^{15}$.

Fig. 8 differs from Fig. 7 in the addition of a plurality of tubes R and baffle-plates C' in the passage S; also, the circumferential passage $F^4$ and transverse passage $F^5$, whereby the gases from $F^3$ are distributed in the passage S; also, the circumferential passages $A^8$ $A^9$ and transverse passages $B^2$ $B^3$, whereby the gases entering the passages $A^6$ $A^7$ are taken from the passage S at various points; also, the mixer N in the cover D. Here also the regulation of the current of gas is based upon gas analyses and readings of thermometers.

Figure 9:
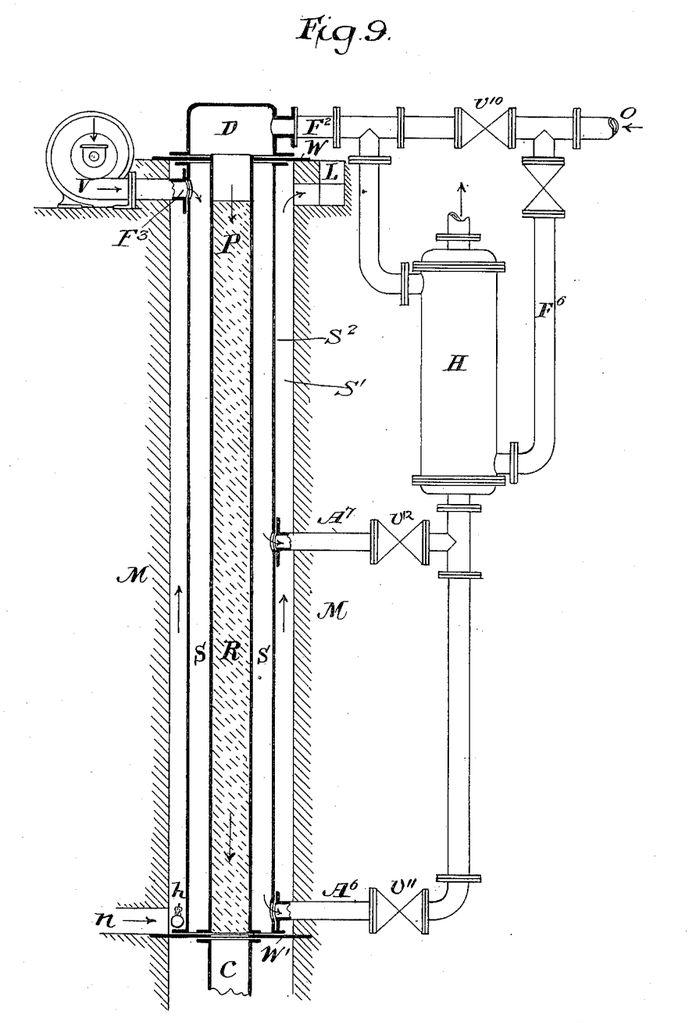
Fig. 9 is an elevation, partly in section, of an apparatus similar to that shown in Fig. 7, excepting that the excess of heat due to the reaction is removed by a current of air from which said heat is transferred to the current of gas containing sulphur dioxide and oxygen on its way to the ingress end of the contact-tube.

In Fig. 9 air or other gas can be used for cooling instead of the gases to be treated. This is especially desirable when rich gases are to be treated, for their volume and quantity are comparatively small and might not be sufficient to cool efficiently. The cooling-current of air or gas is blown by a fan or ventilator V to the hottest part of the contact substance and streams through S. It cools the contact substance and leaves the apparatus by $A^6$ or $A^7$. The heat contained therein can be used in any way desired—for instance, for heating up the gases to be treated entering by $F^6$ in the heat-interchanger H, so that the reaction-zone P does not change its position.

Figure 10:
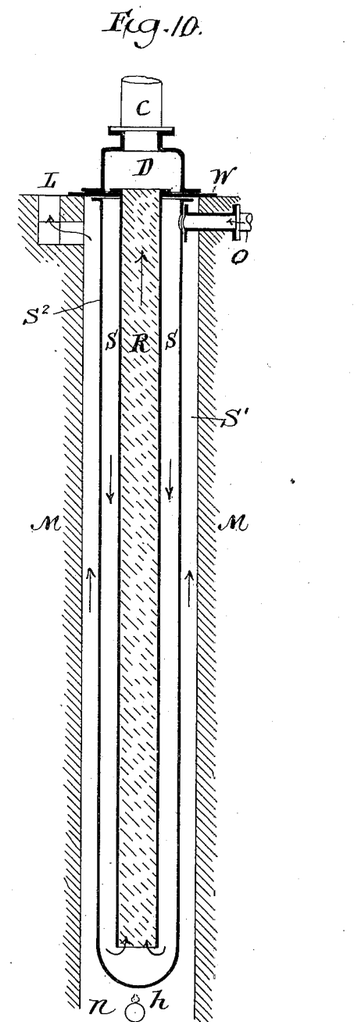
Fig. 10 is a vertical section of another form of apparatus containing a single contact-tube in which the excess of heat due to the reaction is removed by a current of gas containing sulphur dioxide and oxygen on its way to the ingress end of the contact-tube.

In Fig. 10, in brickwork or a pipe M, a pipe $S^2$, closed at the bottom, is fitted to a tube-plate W, and into this pipe projects a tube R, which extends through the tube-plate. The gas containing sulphur dioxide and oxygen enters the tubular pocket $S^2$ at the top and descends in the space S to the bottom of the pocket, where it enters the contact-tube R and ascends through the same, and the sulphuric anhydride escapes through the cover D and passage C. The tubular pocket $S^2$ is surrounded by the upwardly-moving air-current in S', which may be heated by the gas-flame $h$ below the pocket.

Figure 11:
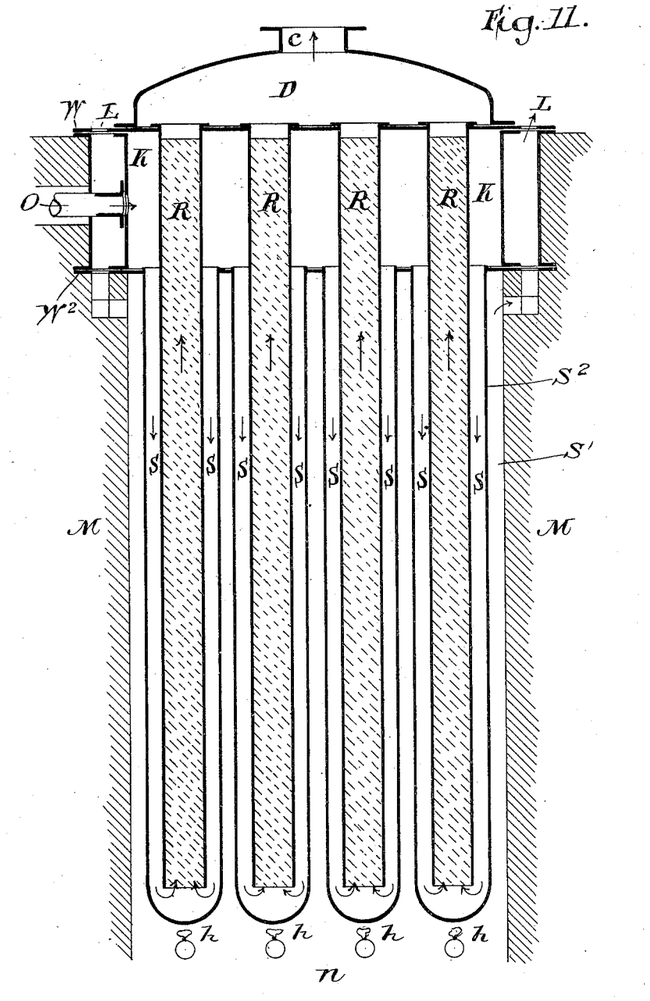
Fig. 11 is a vertical section of an apparatus similar to the last, excepting that it contains a plurality of contact-tubes.

In Fig. 11 a plurality of tubes are used similar to that shown in Fig. 10, excepting that the tubular pockets $S^2$ extend through an additional tube-plate $W^2$, so as to form a box-like chamber K between the tube-plates W and $W^2$, into which the gas containing sulphur dioxide and oxygen passes from the pipe $o$ on its way to the top of the tubular pockets $S^2$, and the space in K serves for the distribution of the entering gases. The gases stream through the space S and cool the contact substance in R. They can be heated further by the source of heat $h$ or cooled by a stream of air regulated at L. The treated gases leave the apparatus through D and $c$.

In the drawings accompanying this application the scale may be taken as being about one-twentieth of real size; but of course the size of the tubes and the relative sizes of the various parts can be varied without departure from the invention.

Mode of procedure: In the above examples I have described various forms of my apparatus and different ways of carrying out my process. I will now give a concrete example of a manner of proceeding in order to obtain as favorable a result as possible when taking the case of a mixture of gases containing about twelve per cent. by volume of sulphur dioxide and a similar quantity of oxygen (the balance of the volume consisting, substantially, of an indifferent gas, such as nitrogen) and treating this mixture in the apparatus of Fig. 4. I heat the apparatus first, say, with gas-burners $h^2$ until a thermometer in the upper cover D shows a temperature of about 300° centigrade. Then the source of heat is cut off, and I then pass the entire stream of gas into the apparatus at A'. The temperature within the cover D first rises. When it has reached a temperature favorable for the reaction, the upper valve $v^2$ is opened, so that a part of the gas enters directly through $F^2$. The gases entering and leaving the apparatus are analyzed to determine their contents of sulphur dioxide, and in this way the practical effect is determined. I regulate the temperature in the interior of the contact apparatus on the basis of the readings of the thermometers in D and $D^3$ by so arranging the cooling stream of gas and the intensity of current by means of the valves $v$, $v'$, and $v^2$ and the temperature, if necessary, with the aid of the heater G that the most favorable conversion of the gas into sulphuric anhydride is achieved. In the above example I achieve this object by passing about two-thirds of the entire gas-current in at A' and one-third direct through $F^2$ into D, so that the temperature in D, which becomes uniform, owing to the action of the mixing-chamber N, is about 380° centigrade, while the thermometer in $D^3$ indicates about 234° centigrade. In this actual case, taken from experimental practice on the factory-scale, I effected a conversion of from ninety-six to ninety-eight per cent. of that theoretically possible, while making from forty to fifty kilograms of sulphuric anhydride per pipe R in twenty-four hours. The conversion can be increased to ninety-nine per cent. if the gas be permitted to remain longer in the presence of the contact substance. It will be noticed that in this actual case when once the reaction has started no external source of heat is employed for its continuation. The gases to be treated enter the apparatus at or about the ordinary temperature of the air. By their cooling action on the contact substance they absorb sufficient heat from it to raise their temperature to that necessary for the reaction, and the resulting gases containing sulphuric anhydride, on account of this cooling action, leave the apparatus at a temperature of about 234°—that is, far below that at which reaction took place. These features, the cold entering gases, no external source of heat, and gases leaving the apparatus at a temperature considerably lower than that of the reaction, are characteristics of the above example of my process.

If weaker gases than those containing about twelve per cent., by volume, of sulphur dioxide be employed, a slight external heating of the cooling gases may be desirable. Thus with gases containing from eight or down to, say, six per cent. sulphur dioxide it is recommended to heat them to a temperature of about 100° to 250° centigrade; but in such cases also the characteristics mentioned can be seen—namely, the temperature of the gases entering the apparatus is lower than that at which the reaction took place in the apparatus, there is little or no further heating of the apparatus, and the gases leaving the apparatus possess a temperature below that at which the reaction took place.

I claim—

1. The process of making sulphuric anhydride which consists in passing a gas containing sulphur dioxide and oxygen through a chamber containing a contact substance while removing from the contents of said chamber excess of heat due to the reaction, substantially as described.

2. The process of making sulphuric anhydride which consists in passing a gas containing sulphur dioxide and oxygen through a chamber containing a contact substance while maintaining in said chamber a temperature which at the hottest part of said chamber is between the composing and decomposing temperature of the sulphuric anhydride being formed, substantially as described.

3. The process of making sulphuric anhydride which consists in passing a gas containing sulphur dioxide and oxygen through a contact substance while maintaining in the contact substance a temperature which at the hottest part of said contact substance is between the composing and decomposing temperature of the sulphuric anhydride being formed, and a decreasing temperature in the direction of the gas-current as it passes through said contact substance, substantially as described.

4. The process of making sulphuric anhydride by the contact method, which consists in passing a gas containing sulphur dioxide and oxygen through a chamber containing contact substance while removing from the contents of said chamber excess of heat due to the reaction by means of a current of fluid moving in a direction the inverse of that in which the current of gas passes through said contact-chamber, substantially as described.

5. The improvement in the process of making sulphuric anhydride by the contact method which consists in passing a gas containing sulphur dioxide and oxygen through a chamber containing contact substance, while cooling the contents of said chamber, whereby the gases leaving said contact substance have a temperature lower than that at which the reaction took place, substantially as described.

6. The process of making sulphuric anhydride which consists in passing a gas containing sulphur dioxide and oxygen through a contact substance thereby attaining a temperature corresponding to a dull-red heat and maintaining the gas surrounding the chamber containing said contact substance at a lower temperature, substantially as described.

7. The improvement in the art of manufacturing sulphuric anhydride by the contact method which consists in removing excess of heat due to the reaction from the contents of the contact-chamber by means of gas containing sulphur dioxide and oxygen on its way to the contact substance, substantially as described.

8. The improvement in the process of making sulphuric anhydride by the contact method which consists in passing a gas containing sulphur dioxide and oxygen through a chamber containing contact substance, while cooling the contents of said chamber by means of the entering gases to be treated, whereby the gases leaving the contact substance have a temperature lower than that at which the reaction took place, substantially as described.

9. The improvement in the art of manufacturing sulphuric anhydride by the contact method which consists in removing excess of heat due to the reaction from that portion of the gas which has been converted into sulphuric anhydride during its passage through the contact substance by absorption of said heat in gas about to be converted into sulphuric anhydride, substantially as described.

10. The improvement in the art of manufacturing sulphuric anhydride by the contact method which consists in removing from gas contained within the contact substance excess of heat due to the reaction by absorption of said heat in a portion of the gas about to be converted into sulphuric anhydride, substantially as described.

11. The process of making sulphuric anhydride which consists in passing a gas containing sulphur dioxide and oxygen into a cooling-chamber surrounding the chamber containing the contact substance, and so into the contact substance whereby the contents of the contact-chamber are cooled and the excess heat due to the reaction removed so that the temperature of the gases leaving the apparatus is less than 350° centigrade, substantially as described.

12. The process of making sulphuric anhydride which consists in passing a gas containing sulphur dioxide and oxygen into a cooling-chamber surrounding the chamber containing the contact substance, and thereby cooling the contact substance while taking up the heat necessary for causing the reaction to go on when the said gases enter the contact substance, substantially as described.

13. The improvement in the art of manufacturing sulphuric anhydride by the contact method which consists in supplying to the contact substance the current of gas containing sulphur dioxide and oxygen to be converted, by the union of a plurality of currents of gas of different temperatures and in regulating the temperature of the united current by regulating the several currents from which the united current is made up while removing from the contents of the contact-chamber excess of heat due to the reaction, all substantially as described.

14. The process of making sulphuric anhydride which consists in passing a gas containing sulphur dioxide and oxygen through a chamber containing a contact substance while removing from the contents of said chamber excess of heat due to the reaction by a current of fluid regulatably distributed to different points from end to end of the contact-chamber, substantially as described.

15. The improvement in the art of manufacturing sulphuric anhydride by the contact method which consists in preliminarily heating substantially to the composing temperature the gas to be converted and subjecting the contents of the contact-chamber to a regulatable cooling whereby the zone of reaction is limited as to extent and location, substantially as described.

16. The improvement in the art of manufacturing sulphuric anhydride by the contact method which consists in heating the entering gases on their way to the contact substance and cooling the reaction-chamber by regulating the temperature of a current of fluid passing into the space adjacent to the same to a temperature below 250° centigrade, substantially as described.

In testimony whereof I have hereunto set my hand in the presence of two subscribing witnesses.

RUDOLPH KNIETSCH.

Witnesses:
ERNEST F. EHRHARDT,
AUG. DINAND.